(No Model.) 8 Sheets—Sheet 1.

A. B. B. HARRIS.
RAILROAD TIE BORING AND TRIMMING MACHINE.

No. 582,915. Patented May 18, 1897.

WITNESSES:
M. D. Blondel.
Edw. W. Byrn.

INVENTOR
A. B. B. Harris.
BY Munn & Co.
ATTORNEYS.

(No Model.) 8 Sheets—Sheet 2.

A. B. B. HARRIS.
RAILROAD TIE BORING AND TRIMMING MACHINE.

No. 582,915. Patented May 18, 1897.

WITNESSES:
W. D. Blondel
Edw. W. Byrn.

INVENTOR
A. B. B. Harris.
BY Munn & Co.
ATTORNEYS.

(No Model.)  8 Sheets—Sheet 3.

A. B. B. HARRIS.
RAILROAD TIE BORING AND TRIMMING MACHINE.

No. 582,915.  Patented May 18, 1897.

Fig. 3.

WITNESSES:
M. P. Bloudel
Edw. W. Byrn.

INVENTOR.
A. B. B. Harris.
BY Munn & Co.
ATTORNEYS.

(No Model.) 8 Sheets—Sheet 5.

A. B. B. HARRIS.
RAILROAD TIE BORING AND TRIMMING MACHINE.

No. 582,915. Patented May 18, 1897.

WITNESSES:
M. D. Blondel
Edw. W. Byrn.

INVENTOR
A. B. B. Harris.
BY Munn & Co.
ATTORNEYS.

(No Model.) 8 Sheets—Sheet 7.

A. B. B. HARRIS.
RAILROAD TIE BORING AND TRIMMING MACHINE.

No. 582,915. Patented May 18, 1897.

WITNESSES:
M. D. Blondell
Edw. W. Byrn.

INVENTOR
A. B. B. Harris.
BY
Munn & Co.
ATTORNEYS.

(No Model.) 8 Sheets—Sheet 8.

A. B. B. HARRIS.
RAILROAD TIE BORING AND TRIMMING MACHINE.

No. 582,915. Patented May 18, 1897.

WITNESSES:
M. P. Blondel
Edw. W. Byrn.

INVENTOR
A. B. B. Harris.
BY
Munn & Co
ATTORNEYS.

THE NORRIS PETERS CO., PHOTO-LITHO., WASHINGTON, D. C.

UNITED STATES PATENT OFFICE.

ALEXANDER B. B. HARRIS, OF BRISTOL, TENNESSEE.

RAILROAD-TIE BORING AND TRIMMING MACHINE.

SPECIFICATION forming part of Letters Patent No. 582,915, dated May 18, 1897.

Application filed May 5, 1896. Serial No. 590,277. (No model.)

*To all whom it may concern:*

Be it known that I, ALEXANDER B. B. HARRIS, of Bristol, in the county of Sullivan and State of Tennessee, have invented a new and useful Improvement in Railroad-Tie Boring and Trimming Machines, of which the following is a specification.

The object of my invention is to provide a machine for quickly, conveniently, and economically leveling the plate or rail surfaces of railroad-ties, boring holes in them for receiving the spikes or other fastenings, and trimming off the ends of the ties, all in a series of consecutive steps in a single operation; and it consists in the special construction and arrangement of the machine organized to accomplish these results, which I will now proceed to describe with reference to the drawings, in which—

The leveling of the bearing-surfaces of the tie and the boring of holes therein are designed to accommodate a special means of fastening railroad-rails to the ties which has been patented by me March 17, 1896, No. 556,348, in which a metal plate is designed to set perfectly true and level upon the top of the tie and has pendent slitted thimbles which enter bored holes in the tie, and are expanded therein by a spike driven in said thimble.

The machine which I am about to describe is intended to plane off the tie to form level flat seats on the top of the same near each end where the tie-plate sets thereon and to bore two holes therein at the same time to receive the thimbles of the tie-plate and their expanding-spikes, and at the same time also said machine trims off the end of the tie to a uniform length and square finish as a gage by which to fix the positions of the tie-plates.

My machine is designed to rest upon the top of a platform-car on the railroad-track and to take the ties up from the ground by an elevator and, after finishing them, as described, discharge them to suitable receiving devices, the machine proper for this purpose being seated, together with its actuating-engine and boiler, upon a turn-table, so that it may be turned to take the ties from and discharge them to either side of the track, as may be required.

In order that I may make the description of my invention more clear and less involved, I will first describe the separate features of my machine and then describe their coöperation.

Figures 1, 13:
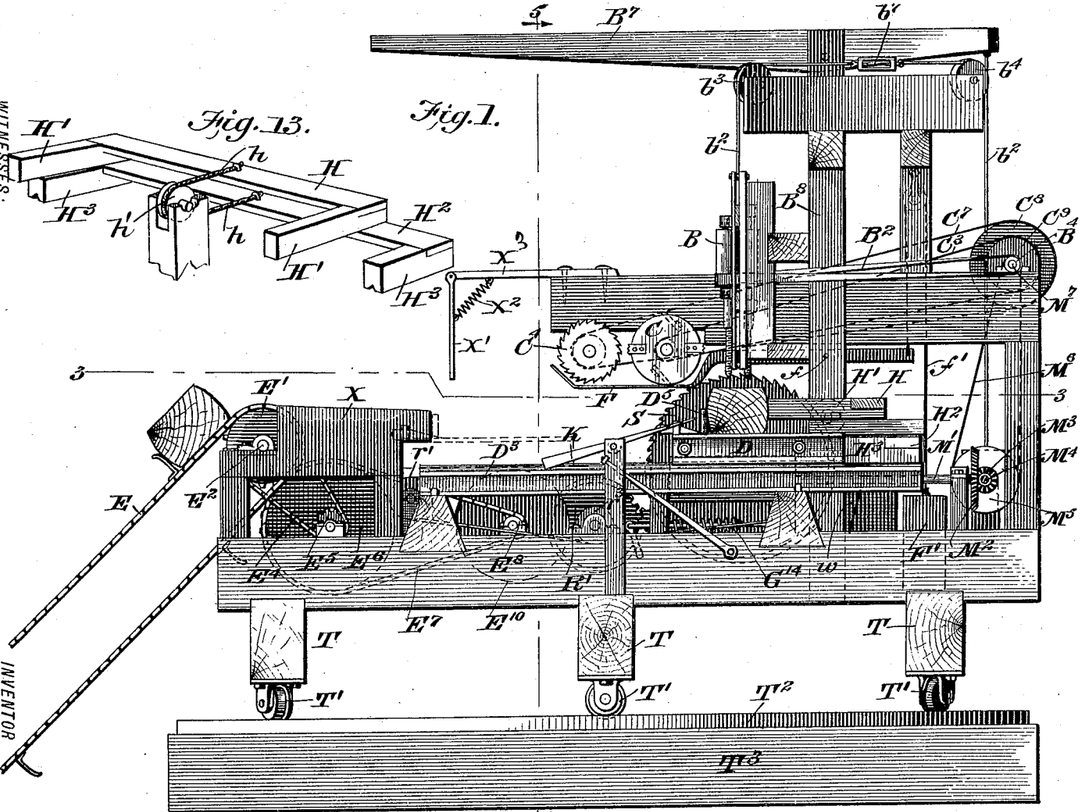
Figure 1 is a side elevation.
Fig. 13 is a detail of the automatic centering device for bringing ties of different widths centrally beneath the boring-bits.
Figure 2:
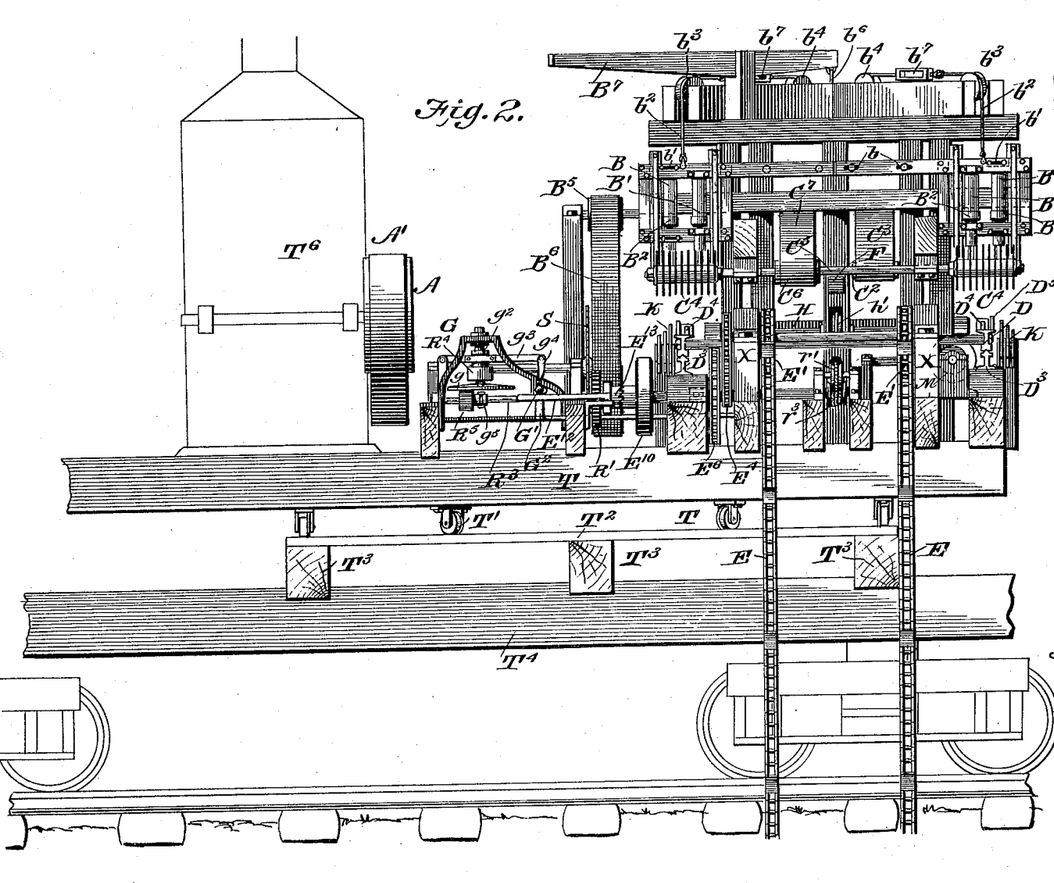
Fig. 2, a front elevation.

*The turn-table.*—In Figs. 1, 2, 4, and 5, T represents a turn-table which has below it flanged rollers T', that travel upon a circular track $T^2$, mounted upon cross beams or sills $T^3$ on the deck or flooring $T^4$ of an ordinary platform-car, as shown in Fig. 2.

Figure 6:
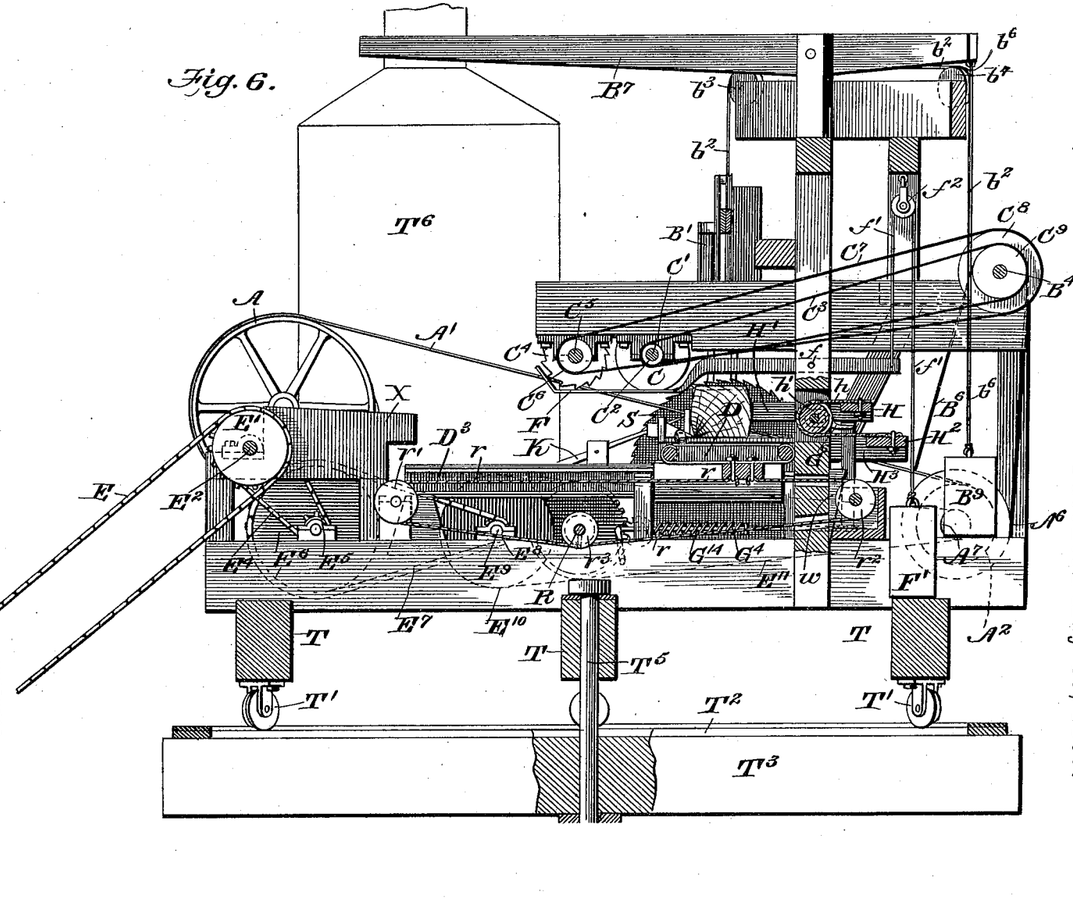
Fig. 6 is a vertical section on line 6 6 of Figs. 3 and 5, looking in the direction of the arrow on said line.

On the turn-table T are mounted the operating parts of the machine, together with the boiler and engine $T^6$, all of which parts are arranged in such relation to a king-bolt $T^5$, Fig. 6, as to be evenly balanced.

Figure 3:
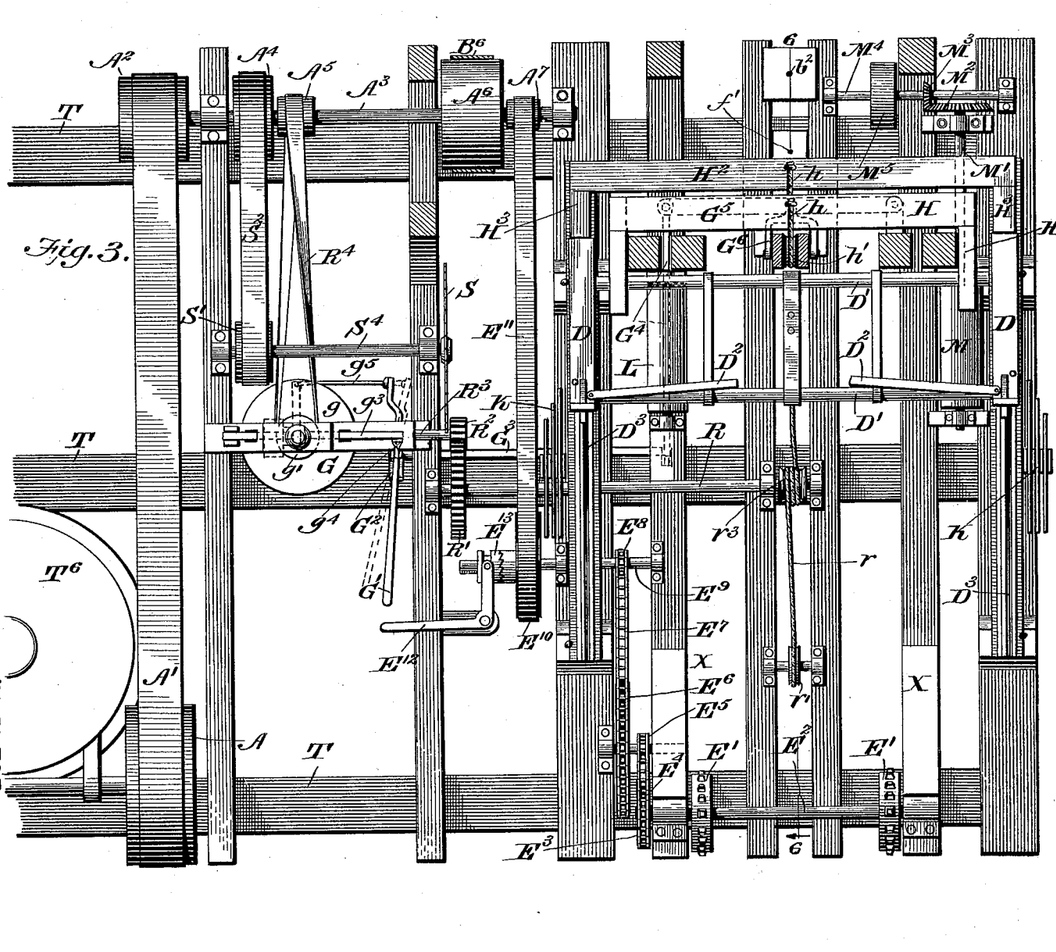
Fig. 3, a sectional plan view of the base-frame of the machine on line 3 3 of Fig. 1.
Figure 4:
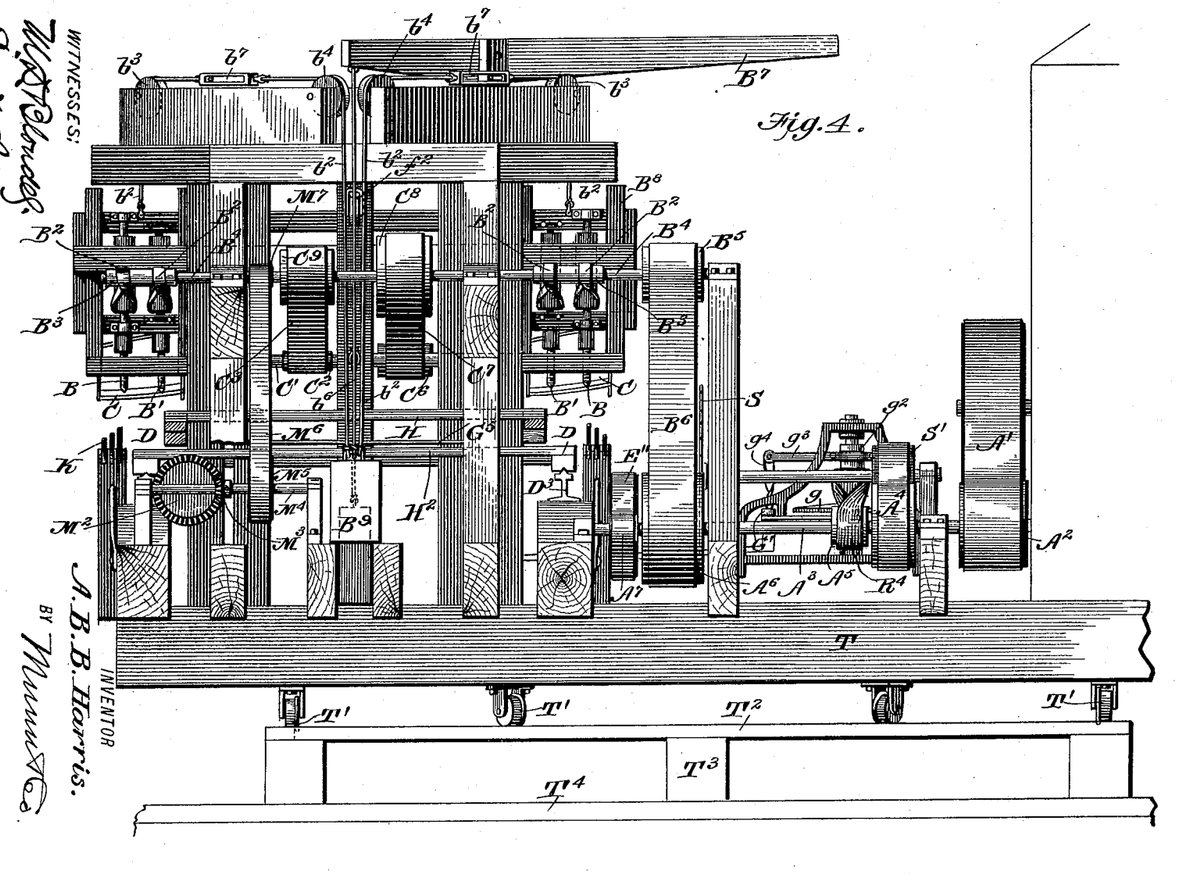
Fig. 4 is a rear elevation.

*General plan of driving mechanism.*—Referring to Fig. 3, the pulley A of the engine drives belt A', connecting with pulley $A^2$ on main shaft $A^3$. A pulley $A^4$ on this shaft drives a cut-off saw for the tie, a pulley $A^5$ drives the tie-carriage, a pulley $A^6$ drives a counter-shaft above and the planing and boring devices, and a pulley $A^7$ drives the elevator mechanism for raising the ties from the ground to the machine.

*Elevator.*—Referring to Figs. 1, 2, 3, and 4, E is the elevator, composed of two chains with spurs on them adapted to lift a tie, as shown in Fig. 1. These chains pass around sprocket-wheels E' on the table-surfaces X, and these sprocket-wheels (see Fig. 3) are rigid on a shaft $E^2$, having a sprocket-wheel $E^3$, connected by a chain $E^4$ to another sprocket-wheel $E^5$ on a short shaft having sprocket-wheel $E^6$, connected by another chain $E^7$ with sprocket-wheel $E^8$ on a shaft $E^9$, bearing a band-pulley $E^{10}$, connected by a belt $E^{11}$ with the drive-pulley $A^7$ of the main shaft $A^3$. This gearing is arranged for a slow motion of the elevator, as is necessary, and a clutch $E^{13}$ and operating-lever $E^{12}$ serve to start or stop the action of the elevator.

*Cut-off saw.*—S is the cut-off saw for trimming off the ends of the ties and reducing them all to the same length, so that the boring-bits and planing devices may operate upon the ties at uniform distances from their ends. This saw (see Fig. 3) is on a shaft $S^1$, driven by a pulley $S'$ and belt $S^2$ from the pulley $A^4$ on the main drive-shaft $A^3$.

*Boring devices.*—Referring to Figs. 1, 2, 5, and 7, B B′ and B B′ are two pair of augers or boring-bits, which pairs are set apart from each other a distance equal to the gage of the road or space between the rails, which distance, however, is made adjustable, so as to change the gage by means of slots and screws $b$, connecting the two halves of the auger-frame, so that they may be set farther apart or closer together. The two bits of each pair are also designed to be set a different distance from each other to suit the size of the tie-plate or distance between the spike-holes, and for this purpose one bit of each pair is journaled in bearings that are made adjustable to or from the other bit of that pair by means of slots and screws $b'$. These boring-bits are rotated by crossed belts $B^2$ $B^2$, Fig. 4, which extend to the rear of the machine and are driven by small pulleys $B^3$ on a counter-shaft $B^4$, which through a pulley $B^5$ and vertical belt $B^6$ derives its motion from the pulley $A^6$ on the main drive-shaft $A^3$ below. These boring-bits are moved up and down at will to cause them to penetrate or leave the tie in boring the holes through the agency of a hand-lever $B^7$ as follows: The frame or head carrying the boring-bits is (see Fig. 7) suspended upon cords $b^2$ $b^2$ and is guided up and down upon the vertical frame-bars $B^8$ $B^8$. These suspending-cords (see Figs. 1, 4, and 5) pass over front pulleys $b^3$ $b^3$, journaled in the top of the framework, and then converge to the rear and pass over rear pulleys $b^4$ $b^4$ at the back of the framework, and then descending (see Fig. 4) are attached to a heavy weight $B^9$, which tends to raise the frame of the augers or boring-bits. To this same weight is attached a cord $b^6$, Fig. 4, extending upwardly to the rear end of the hand-lever $B^7$, so that when the front end of the hand-lever is lowered it lifts the weight $B^9$ and allows the auger-frame to descend and allows the augers to enter the tie, and when the hand-lever is released the weight causes the auger-frame to rise, withdrawing the augers from the tie. Two turnbuckles $b^7$ serve to tighten the cords $b^2$ when they become stretched and elongated and also furnish means of adjusting the auger-frame.

*Planing devices.*—Just in front of each pair of augers is a cutter-head C, (see Figs. 7, 4, 6, and 8,) both arranged upon the same axial shaft, which bears a pulley $C^2$, Fig. 6, driven by a belt $C^3$ from the pulley $C^9$ on the horizontal counter-shaft $B^4$ in the rear of the machine, and just in front of each cutter-head is a gang of scoring-saws $C^4$ $C^4$, both in the same axial shaft $C^5$, which is provided with a pulley $C^6$, (see Figs. 6 and 7,) driven by a belt $C^7$ from a pulley $C^8$ on the counter-shaft $B^4$. (See Fig. 4.) As the cutter-heads operate upon the ties crosswise its grain, I find it necessary to score the faces of the ties in the line of the cutter-head, so that the chips may be easily released and find clearance.

Figures 7, 8:
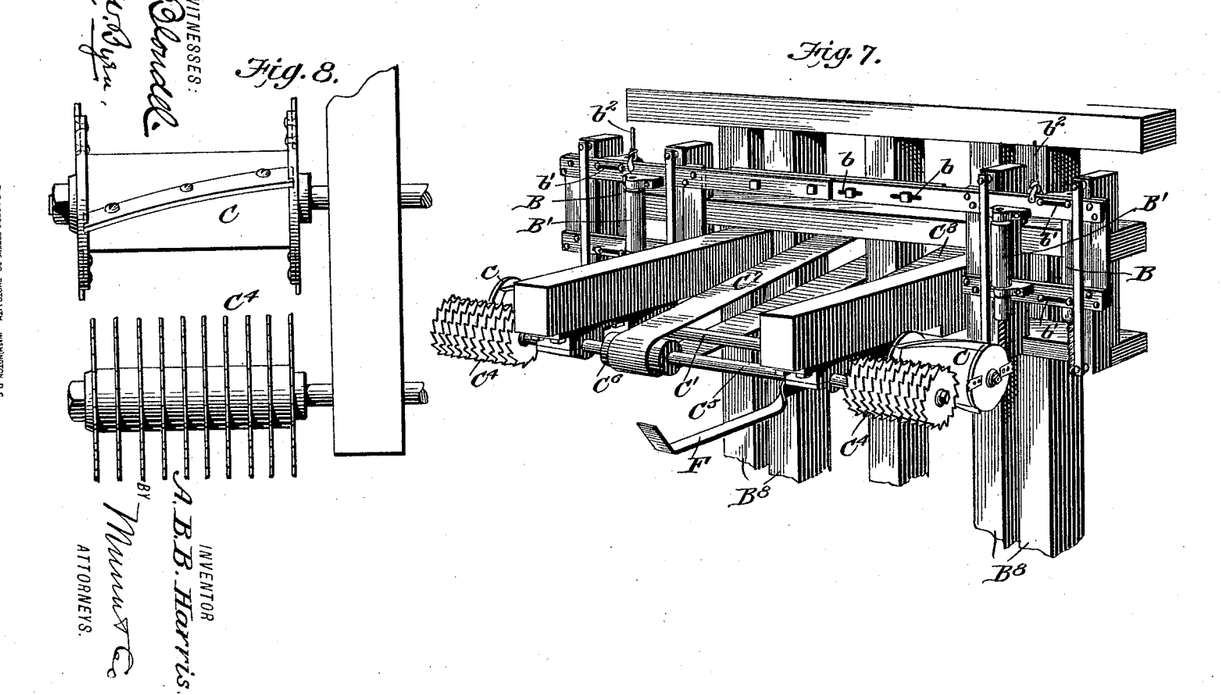
Fig. 7 is a detail perspective view of the boring and planing devices.
Fig. 8 is a detail plan of the cutter-head and scoring-saws.

Between the planing and scoring devices is arranged a presser-foot to hold the tie down against the lifting action of the cutter-head and saws. This presser-foot is made in the form of a lever F, fulcrumed at $f$ in the framework and having its operating end bent up, as shown in Figs. 6 and 7. The rear end of this lever is attached to a cord $f'$, which passes up and around a pulley $f^2$ and then down to a weight $F'$, whose gravity serves to hold the rear end of the presser-foot lever up and its front end down upon the tie.

Figure 5:
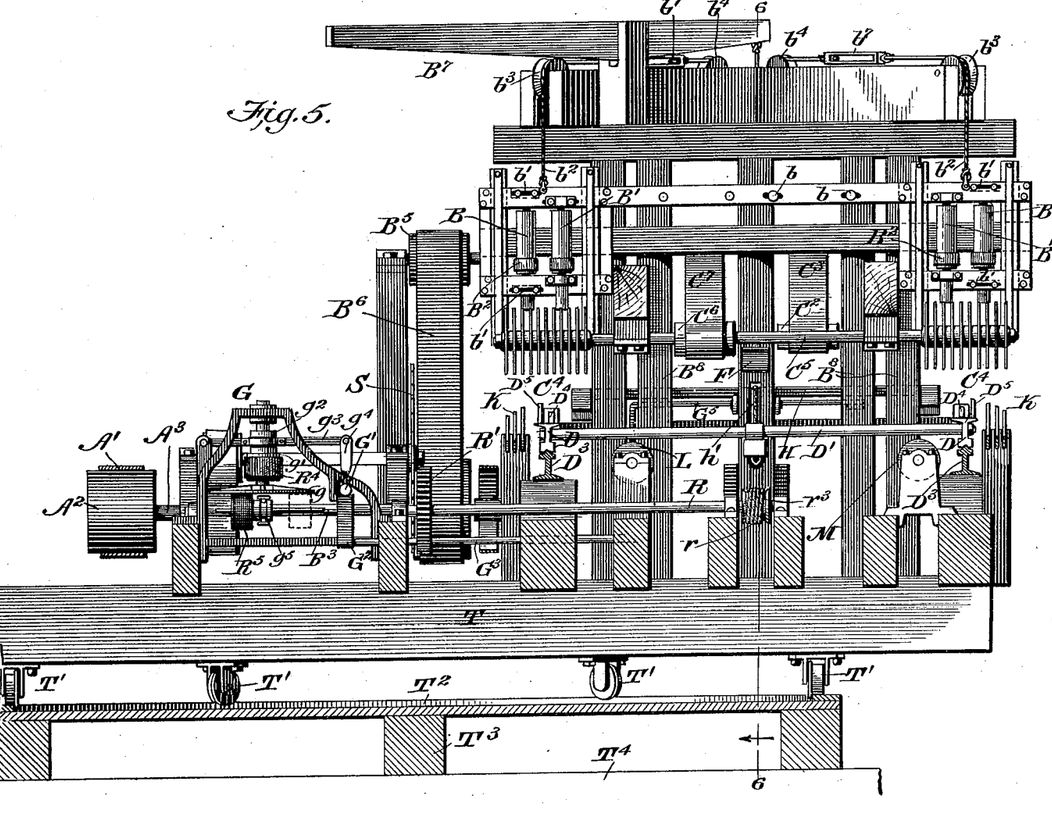
Fig. 5 is a vertical section on line 5 5 of Fig. 1, looking in the direction of the arrow on said line.
Figure 10:
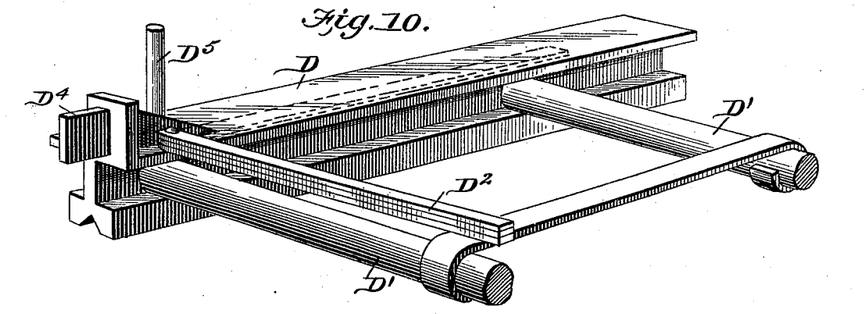
Fig. 10 is a detail perspective of one end of the carriage.

*Tie-carriage.*—Referring to Figs. 3, 5, and 10, D D are two sliding bars grooved upon their lower sides and running back and forth upon the tops of guide-rails $D^3$ $D^3$. The bars D D are connected by rods $D'$ $D'$ to form a rectangular frame, which holds the ties which lie upon and at right angles to the bars D D. As ties vary in thickness and they must all be brought up to the level of the scoring-saws and cutter-head, a set of pivoted spacing-arms $D^2$, Fig. 10, is arranged at each end of the carriage, and one or more of them is turned parallel with the bars D (see dotted lines in Fig. 10) to raise the ties of varying widths to the requisite height. To compensate for hollows or irregularities in the ties, metal wedges $D^4$ are arranged in keepers on the carriage-frame and are forced in to aid in leveling the tie more or less as occasion requires.

$D^5$ are back-stop pins rising vertically from the carriage behind the tie to hold the latter as it advances to the planing and boring devices.

Figure 11:
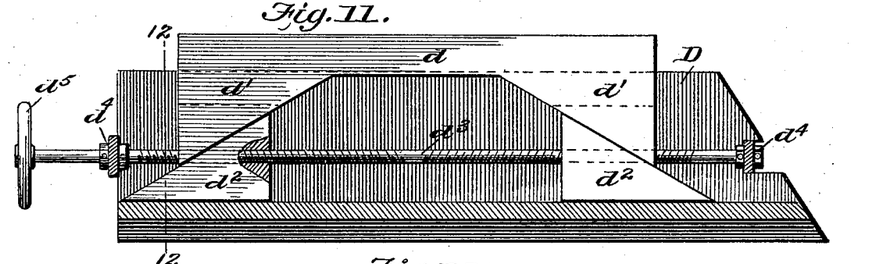
Figs. 11 and 12 are side and cross-sectional views of a modified means for adjusting the carriage vertically.
Figure 12:
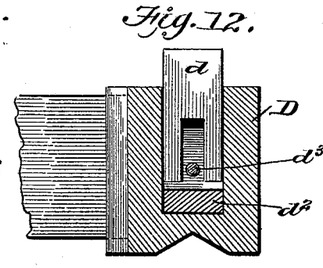

As a modification of the means for adjusting the tie vertically on the carriage I have provided the devices shown in Figs. 11 and 12, in which the carriage-bars D are channeled longitudinally on their upper sides and have in the channel a shaft $d^3$, swiveling in bearings $d^4$ $d^4$ and having at its outer end a hand-wheel $d^5$ or crank. This shaft is provided with right and left screw-threads which are respectively tapped through incline blocks or wedges $d^2$ $d^2$, which play beneath corresponding inclined faces $d'$ $d'$, formed on the bottom side of the lift-bar $d$, which plays vertically in the channel of the carriage-bar. By turning the hand-wheel it will be seen that the right and left screw-threads, acting upon the wedges $d^2$ $d^2$, cause the lift-bar $d$ to rise or fall, according to the direction of the rotation, so as to easily and quickly adjust the tie vertically, which tie rests in this case upon the lift-bar $d$.

*Means for reciprocating tie-carriage.*—The bottom of the tie-carriage is connected (see Fig. 6) to an endless rope belt $r$, which passes around pulleys $r'$ $r^2$ at the front and back of the machine, and at an intermediate point has its ends permanently attached and wrapped several times around a drum $r$, which (see Figs. 3 and 5) is on a shaft R, bearing a gear-wheel $R'$, which meshes with a gear-wheel $R^2$ on a shaft $R^3$, and which through a reversing mechanism G receives motion from a crossed belt $R^4$, connecting with pulley $A^5$ on the main shaft. As the drum $r^3$ rotates in one direction or the other it will be seen that it turns the rope belt $r$ in one direction or the other and moves the carriage back or forth upon the guideways. The reversing-gear G is not new in itself and comprises a friction-disk $g$, Figs. 3 and 5, and a friction-pulley $R^5$, sliding on shaft $R^3$ and locked to it for rigid rotation by a feather or spline. When friction-pulley $R^5$ is on one side of the center of disk $g$, feed motion is transmitted to the carriage in one direction. When on the other side, as in dotted lines, Fig. 5, motion is transmitted to the carriage for the opposite movement, and when friction-disk $g$ and pulley $R^5$ are out of contact no feed motion is transmitted at all. These adjustments are supplied through hand-lever $G'$, which is fulcrumed upon a universal joint and has both an up-and-down and sidewise adjustment. When lifted up and down, an arm $g^4$ on said lever lifts yoke-bar $g^3$, whose collar $g^2$ swivels in a groove on the hub of band-pulley $g'$, connecting with driving-belt $R^4$. These devices serve to lift disk $g$ away from friction-pulley $R^5$ to break connection. When the lever $G'$ is moved sidewise, an arm $g^5$, whose forked end embraces the hub of friction-pulley $R^5$, (see Fig. 5,) shifts friction-pulley $R^5$ to one side or the other of the center of the disk $g$, so as to reverse the motion.

*Centering device for tie.*—It will be understood that it is always necessary to bring the tie centrally beneath the boring-augers, and as the ties vary in width it is necessary to provide some automatic mechanism for bringing both narrow and broad ties centrally beneath the boring-auger. For this purpose I provide an equalizing stop-frame, which will best be understood from Figs. 1, 3, and 13.

H H' H' is a U-shaped frame, and $H^2$ $H^3$ $H^3$ is another U-shaped frame a little below the above-named frame. The first-named, H H', lies in the plane of the tie (see Fig. 1) and acts as a stop for the same. The second, $H^2$ $H^3$, lies in the plane of the carriage D and acts as a stop for the carriage, and these two frames are connected together and arranged to slide horizontally, so as to be compensating and reciprocally acting. They are connected by a cord $h$, (see Figs. 3, 6, and 13,) which passes around a pulley-wheel $h'$. If a tie broader than usual is on the carriage, said tie strikes the frame H H' before the carriage strikes its frame $H^2$ $H^3$. The result is that frame H H' is pushed back and frame $H^2$ $H^3$ is drawn forward to the carriage, causing the carriage to be stopped earlier in its travel, allowing for one half the increased size of the tie on one side of the tie and the other half on the other side and bringing the wider tie into a true central position. If, on the other hand, a very narrow tie is on the carriage, the carriage strikes its frame $H^2$ $H^3$ first, and the latter yields and allows the carriage to advance farther than usual, also bringing the top frame H H' up to and against the tie, and thus taking up one half of the deficiency of this tie's width on one side and the other half on the other side and still bringing this narrow tie to the center to be bored. This device, it will be seen, is automatic and exactly compensating and has a range of use which adapts it to any form of machine in which the middle or centers of objects of varying size are to be brought to a central position.

Figure 9:
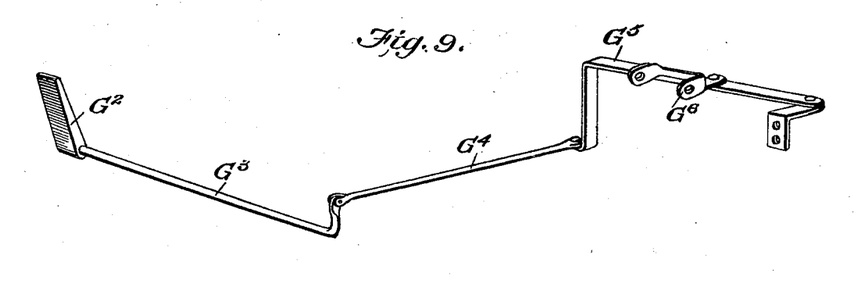
Fig. 9 is a detail view of the automatic stop mechanism.

*Automatic stop.*—To automatically stop the carriage motion when the stop-frames H H' and $H^2$ $H^3$ are both brought into bearing, the pulley $h'$ is made to yield and trip the feed mechanism of the carriage, as follows: The journal of pulley $h'$ is arranged to slide in horizontal slots in the main frame, (see Figs. 13, 9, and 3,) and said journal is carried in a bracket $G^6$ of a horizontal lever $G^5$, whose end is attached to a pull-rod $G^4$, pivoted to a crank on the rock-shaft $G^3$, which at its other end has a tappet-arm $G^2$, that rests immediately below the hand-lever $G'$ for the feed device. Now when the tie comes to a full bearing against both of its frames H H' and $H^2$ $H^3$ the pulley $h'$ moves to the rear, forcing back bracket $G^6$, lever $G^5$, rod $G^4$, and by rocking shaft $G^3$ causes its tappet-arm $G^2$ to lift the hand-lever $G'$ and disconnect the friction-disk $g$ from friction-pulley $R^5$, thus stopping the feed. To bring back the pulley $h'$ again to its normal position after the pressure of the tie is removed, a spiral spring $G^{14}$ (see Fig. 6) on rod $G^4$ forces back the latter and brings the lever $G^5$ and bracket $G^6$, with pulley $h'$, forward again.

*Tie-discharging device.*—After a tie has been cut-off, planed, and bored it is to be automatically discharged from the machine. For this purpose (see Figs. 1 and 3) I fulcrum upon the rigid framework on each side of the carriage-track a set of gravity-detents K, whose ends next to the boring devices are held up by the superior gravity of their other ends. When the carriage runs forward to the boring devices, the high ends of these detents are simply pressed down by the tie which passes over them, the detents immediately rising again, but when the carriage moves back after the tie is bored these detents engage the tie and hold it stationary while the carriage slides from beneath it, allowing the tie to drop upon subjacent rollers to be discharged. To adapt these detents to ties of varying width, said detents are made in sets of varying length, as in Figs. 3 and 5, the shortest ones of which engage the widest ties and the longest ones the narrowest ties, thus causing the ties to be promptly discharged as soon as the carriage starts to move back.

L M, Fig. 3, are the subjacent rollers, upon which the tie falls when discharged from the carriage. Of these rollers L is a dead-roller, while M is a positively-actuated roller, or both may be positive rollers, if desired. To actuate them, (see Figs. 3 and 1,) the roller M is rigid on a horizontal shaft $M'$, bearing a bevel-gear $M^2$, which engages with another bevel-gear $M^3$ on a shaft $M^4$ at right angles, and which latter is provided with a pulley $M^5$, driven by a belt $M^6$ from a corresponding pulley $M^7$ on the counter-shaft $B^4$ above.

*General operation.*—The several features of my invention having been now described, their coöperation is as follows: As the tie is raised upon the elevator it is adjusted by hand upon the carriage, which is drawn back to receive it close under the edge of the table-surface X, as shown by dotted lines in Fig. 1. The tie is then allowed to rest against the back-stop pins $D'$ and is leveled up to the required height by the spacing-arms $D^2$ and wedges $D^4$ or by the lifting device shown in Fig. 11. The hand-lever $G'$ is then adjusted to advance the carriage, and it moves forward and the face of the tie is scored and planed by the scoring-saws and cutter-heads and the end sawed off to a uniform length by the gage-saw. When it arrives beneath the boring-augers, the handle-lever $B^7$ is depressed and the boring-augers enter the tie and bore the holes. The auger-head is then raised to withdraw the augers and the carriage-feed is reversed. As the carriage moves backward the tie is caught by the detents K and is shoved off onto the discharging-rollers L M, which discharge the finished tie to any suitable carrying devices.

In making use of my invention it is not at all confined to preparing ties for plates, but may be used for preparing ties for the direct reception of the rails. In such connection the saving of labor in putting them on the track will more than balance the cost of putting the ties through the machine. It will also insure a perfect gage. It will give both rails a perfect bearing on the ties, which will prevent the same from rolling on the ballast, and it will also add fifteen to twenty per cent. to the life of the tie.

To make an easy and quick mode of taking up the slack in feed cable-belt $r$, Fig. 6, the frame or wooden box that carries pulley $r^2$ is adjustable by two wedges, one of which is shown in Fig. 6, (marked $w$.) These wedges work on opposite sides of cable $r$ and against the center frame-timbers, through which cable $r$ passes.

I also provide (see Fig. 1) a swinging gage to show how high to raise a thin tie, so that it will be properly surfaced when fed under the planer. $X^3$ is a horizontal bar fastened to the timbers bearing the cutter-heads and bearing at its outer end a swinging gage $X'$. There is a gage at each end of the tie, and a coil-spring $X^2$ is attached to them to prevent the swinging gage from having too wide a range of movement.

I am aware that it is not new in woodworking to employ a gang of scoring-saws for cutting across the grain to facilitate the subsequent action of cutter-knives, and I make no broad claim to this idea.

Having thus described my invention, what I claim as new, and desire to secure by Letters Patent, is—

1. A machine for planing and boring railroad-ties, comprising a horizontally-reciprocating carriage arranged to support the tie and move it laterally, a gang of scoring-saws arranged in stationary bearings above the tie-carriage to cut transverse scores in the top of the tie, cutter-heads arranged behind the scoring-saws parallel therewith and above the carriage, and a set of boring-bits arranged vertically above the carriage and behind the cutter-heads to move in a direction at right angles to the tie-carriage and in the path of the cut on the tie, and means for actuating these parts substantially as shown and described.

2. A machine for planing and boring railroad-ties, comprising a turn-table adapted to be carried upon a car, an elevator leading from the ground to the top of the turn-table, a tie-carriage arranged upon the turn-table and planing and boring devices arranged upon the turn-table substantially as shown and described.

3. A machine for cutting off the ends, planing the plate or rail-seats, and boring the spike-holes of railroad-ties, comprising a horizontally-reciprocating carriage arranged to support a tie and move it laterally, a gang of scoring-saws arranged in stationary bearings above the carriage to cut transverse scores in the upper face of the tie, cutter-heads arranged behind the scoring-saws parallel therewith and above the tie-carriage, a set of boring-bits arranged vertically above the carriage and behind the cutter-heads to move in a direction at right angles to the carriage and in the path of the cut on the tie, a saw arranged in a vertical plane at the end of the carriage to trim off the end of the tie, and means for actuating these parts substantially as and for the purpose described.

4. In a tie-boring machine, the combination with the reciprocating carriage carrying the tie, a set of boring-bits arranged above it, and a compensating device for automatically centering the ties to the bits irrespective of the size of the ties, comprising two yielding stop-frames, one arranged in the plane of the tie and the other in the plane of the carriage, and both connected substantially as described for a reversed motion as set forth.

5. A turn-table provided with a tie planing and boring machine at one end and a boiler and engine at the other and with supporting-rollers underneath, combined with a subjacent circular track $T^2$ and supporting-sills $T^3$ adapted to be carried upon the top of a platform-car substantially as shown and described.

6. In a tie-boring machine, the combination with a vertically-adjustable head or frame carrying boring-spindles at the ends thereof, and vertical guides for said frame; of suspending cords or chains $b^2 b^2$, pulleys $b^3 b^3 b^4 b^4$ at the top of the framework supporting said cords or chains, the front pulleys $b^3 b^3$ being set near the ends of the frame, and the rear ones $b^4 b^4$ close together, a single balance-weight $B^9$ connecting with cords $b^2 b^2$ below the pulleys $b^4 b^4$, and a hand-lever $B^7$ to throw the boring-frame out of balance and move it up or down substantially as and for the purpose described.

7. A woodworking-machine having a reciprocating carriage with automatically operating and compensating stop devices for stopping the carriage at various points to bring the center of the object acted upon directly beneath the center of the cutting-tool, said compensating stop devices comprising two sliding stop-frames, one in the plane of the object being acted upon and the other for contact with the carriage, and both frames being connected for a reverse movement substantially as herein shown and described.

8. The combination with the tie-carriage, and the gears for reciprocating it, of the compensating stop-frames connected for a reverse motion, a wheel $h'$ having yielding journals, and a bracket for said journals with connecting mechanism extending to the feed-gears of the carriage, whereby the yielding of the said wheel under the stop-impact is made to stop the feed of the carriage substantially as shown and described.

9. The combination of the tie-carriage, the cord $r$, pulleys $r' r^2$, shaft R with drum $r^3$ and gear-wheel R', and the stopping and reversing gear G; the compensating stop-frames H H' $H^2$ $H^3$ flexible connection $h$ and pulley $h'$ for a reversed motion, the journals of said pulley being carried in bracket $G^6$, and lever $G^5$, rod $G^4$, rock-shaft $G^3$ and tappet-arm $G^2$, connecting the said bracket with the stop devices of the carriage-feed substantially as shown and described.

10. In a tie planing and boring machine the combination of the horizontally-reciprocating tie-carriage, the scoring-saws and cutter-heads arranged above the carriage upon horizontal axes, and an adjustable lifting device on the carriage for raising the level of these ties to proper contact with the saws and cutter-heads substantially as and for the purpose described.

11. In a tie planing and boring machine the combination with the horizontally-reciprocating carriage; of a series of pivoted and horizontally-adjustable spacing-arms $D^2$ arranged on each side of the carriage to raise the level of the tie substantially as and for the purpose described.

12. In a tie planing and boring machine the combination with the horizontally-reciprocating carriage; of a pendent superposed and flexible stop-gage arranged in a vertical position above the point where the carriage receives the tie to stop the tie when the latter is raised and to yield with the tie and carriage when the latter are moved horizontally substantially as shown and described.

13. In a tie planing and boring machine, the combination with the carriage; of a pair of back stop-pins $D^5$, keepers and wedges $D^4$, and pivoted leveling-arms $D^2$ substantially as and for the purpose described.

14. In a tie planing and boring machine, the combination with the reciprocating carriage, of a series of gravity pawls or detents fulcrumed on the stationary frame and made of different lengths and placed a little behind the position of extreme advance of the carriage to engage the tie on the retreat of the carriage and shove it off the carriage substantially as and for the purpose described.

15. In a tie boring and planing machine, the combination of the reciprocating carriage, the discharging pawls or detents fulcrumed on the stationary frame, and subjacent receiving-rollers and mechanism for positively actuating one or more of them to discharge the tie from the machine substantially as shown and described.

ALEXANDER B. B. HARRIS.

Witnesses:
 CARL A. JONES,
 HOMER E. JONES.